United States Patent
Chen et al.

(10) Patent No.: US 11,029,462 B2
(45) Date of Patent: Jun. 8, 2021

(54) BACKLIGHT MODULE HAVING AN OPTICAL FILM AND DISPLAY APPARATUS HAVING THE SAME

(71) Applicant: Coretronic Corporation, Hsin-Chu (TW)

(72) Inventors: Ping-Yen Chen, Hsin-Chu (TW); Chung-Yang Fang, Hsin-Chu (TW); Jen-Wei Yu, Hsin-Chu (TW); Yang-Ching Lin, Hsin-Chu (TW); Yu-Fan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/884,027

(22) Filed: May 26, 2020

(65) Prior Publication Data
US 2020/0379162 A1 Dec. 3, 2020

(30) Foreign Application Priority Data
May 29, 2019 (CN) .......................... 201910455228.2

(51) Int. Cl.
*F21V 8/00* (2006.01)
*G02F 1/13* (2006.01)

(52) U.S. Cl.
CPC ......... *G02B 6/0053* (2013.01); *G02B 6/0038* (2013.01); *G02B 6/0051* (2013.01); *G02F 1/1323* (2013.01)

(58) Field of Classification Search
CPC .. G02B 6/0053; G02B 6/0038; G02B 6/0051; G02F 1/1323
See application file for complete search history.

(56) References Cited

U.S. PATENT DOCUMENTS

| 7,430,358 | B2 | 9/2008 | Qi et al. |
| 7,530,721 | B2 | 5/2009 | Mi et al. |
| 2007/0002230 | A1* | 1/2007 | Jang ...................... G02F 1/1323 349/117 |
| 2007/0047258 | A1 | 3/2007 | Yao et al. |

(Continued)

FOREIGN PATENT DOCUMENTS

| CN | 1987606 | 6/2007 |
| CN | 101457906 | 6/2009 |

(Continued)

*Primary Examiner* — Tracie Y Green
(74) *Attorney, Agent, or Firm* — JCIPRNET

(57) ABSTRACT

A backlight module including a light guide plate, a light source, an optical film, a first prism sheet and a second prism sheet is provided. The light guide plate has a light incident surface and a light emitting surface connected to each other. The light source is disposed on a side of the light incident surface. The optical film is overlapped with the light emitting surface and has a plurality of optical microstructures facing the light emitting surface. An angle between the extending direction of the optical microstructures and the light incident surface is 90 degrees or between 45 degrees and 90 degrees. The first prism sheet and the second prism sheet are overlapped with the optical film and are positioned on a side of the optical film being far away from the light guide plate. A display apparatus adopting the backlight module is also provided.

9 Claims, 8 Drawing Sheets

(56) References Cited

U.S. PATENT DOCUMENTS

| | | | |
|---|---|---|---|
| 2008/0130317 A1* | 6/2008 | Shimura | B29D 11/00278 362/620 |
| 2009/0103008 A1* | 4/2009 | Nasu | G02F 1/1336 349/64 |
| 2010/0079702 A1* | 4/2010 | Ito | G02B 6/0013 349/64 |
| 2015/0268404 A1* | 9/2015 | Chiu | G02B 6/0073 362/606 |
| 2018/0180794 A1* | 6/2018 | Harada | G02B 5/0278 |
| 2018/0210243 A1* | 7/2018 | Fang | G02F 1/1334 |
| 2018/0224697 A1* | 8/2018 | Yuki | G02F 1/133524 |
| 2020/0049880 A1* | 2/2020 | Ooishi | B60K 37/06 |
| 2020/0379159 A1* | 12/2020 | Li | G02B 6/0025 |

FOREIGN PATENT DOCUMENTS

| | | |
|---|---|---|
| TW | 200846712 | 12/2008 |
| TW | 201426104 | 7/2014 |
| TW | 201827894 | 8/2018 |

\* cited by examiner

BACKLIGHT MODULE HAVING AN OPTICAL FILM AND DISPLAY APPARATUS HAVING THE SAME

CROSS-REFERENCE TO RELATED APPLICATION

This application claims the priority benefit of China application serial no. 201910455228.2, filed on May 29, 2019. The entirety of the above-mentioned patent application is hereby incorporated by reference herein and made a part of this specification.

BACKGROUND

Technical Field

The disclosure relates to an optical module and a display apparatus, and more particularly to a backlight module and a display apparatus.

Description of Related Art

Along with the widespread application of non-self-luminous displays such as liquid crystal display, the design of the backlight module needs being adjusted for different purposes. In order to improve the energy utilization rate of the light source, a backlight module equipped with a brightness enhancement film (BEF) has become one of the mainstreams in the market. In general, this type of backlight module is a laminated structure having two brightness enhancement films (for example, two prism sheets that have the prisms having the extending directions perpendicular to each other), so as to redirect the light beam emitted from the light guide plate at large angle to a specific viewing angle range (such as from −60 degrees to 60 degrees) covering the normal viewing angle, thereby improving the overall intensity of light emitted from the backlight module at the normal viewing angle. However, the backlight module adopting two brightness enhancement films can not meet the specification requirements for the light collecting efficiency of the backlight module of the anti-peep display apparatus.

In order to further increase the light collecting efficiency of the backlight module, a type of light-collecting backlight module that adopts a reverse prism sheet to replace the two laminated brightness enhancement films is developed. This type of backlight module can further increase the total amount of light emitted at the normal viewing angle (which means having the light focusing characteristic with a smaller angular range). Otherwise, since the number of stacked optical film layers carried by the light collecting backlight module is decreased, so the overall thickness of the backlight module can be effectively reduced. However, from another point of view, in the light-collecting backlight module, the light beams of the total internal reflection inside the light collecting reverse prism sheet are less, the reverse prism sheet has a low haze and cannot be used with a diffusion sheet. Therefore, when there exist small defects or tiny objects (such as dusts or shavings are brought in during assembly) between the film layers of the backlight module, they are easily detected in the process of the optical inspection of the following quality control. In other words, the backlight module with excellent light collecting efficiency has poor concealing ability to prevent small defects, which results in a decrease in overall assembly yield rate. Therefore, how to balance the light collecting efficiency and concealing ability of the backlight module is one of the problems that manufacturers need to face when designing and developing.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a backlight module having high assembly yield rate and good light collecting efficiency.

The disclosure provides a display apparatus which has higher total amount of light emitted at a viewing angle close to the normal viewing angle.

Other target and good point of the disclosure is providing a better understanding based on the technical characteristic that is disclosed.

In order to achieve at least one of the above-mentioned objectives, one embodiment of the disclosure provides a backlight module. The backlight module includes a light guide plate, a light source, an optical film, a first prism sheet and a second prism sheet. The light guide plate has a light incident surface and a light emitting surface connected to each other. The light source is disposed on a side of the light incident surface of the light guide plate. The optical film is overlapped with the light emitting surface of the light guide plate and has a plurality of optical microstructures facing the light emitting surface. An angle between the extending direction of the optical microstructures and the light incident surface is 90 degrees or between 75 degrees and 90 degrees. The first prism sheet and the second prism sheet are overlapped with the optical film and are positioned on a side of the optical film being far away from the light guide plate. An extending direction of a plurality of prism structures of the first prism sheet is not parallel to an extending direction of a plurality of prism structures of the second prism sheet.

In order to achieve at least one of the above-mentioned objectives, one embodiment of the disclosure provides a display apparatus. The display apparatus includes a display panel, a light guide plate, a light source, an optical film, a first prism sheet and a second prism sheet. The light guide plate has a light incident surface and a light emitting surface connected to each other. The display panel is overlapped with the light emitting surface. The light source is disposed on a side of the light incident surface of the light guide plate. The optical film is overlapped with the light emitting surface of the light guide plate and is located between the light guide plate and the display panel. The optical film has a plurality of optical microstructures facing the light emitting surface. An angle between an extending direction of the optical microstructures and the light incident surface of the light guide plate is 90 degrees or between 45 degrees and 90 degrees. The first prism sheet and the second prism sheet are overlapped with the optical film and are located between the display panel and the optical film. An extending direction of a plurality of prism structures of the first prism sheet is not parallel to an extending direction of a plurality of prism structures of the second prism sheet.

Based on the above, in the backlight module and the display apparatus of the embodiment of the disclosure, the optical film has a plurality of optical microstructures facing the light guide plate, and the angle between the extending direction of the optical microstructures and the light incident surface of the light guide plate is 90 degrees or between 45 degrees and 90 degrees, so as to increase the total amount of light emitted by the backlight module at a viewing angle close to the normal viewing angle (namely, increasing the light collecting efficiency of the backlight module). On the other hand, the two prism sheets are disposed on a side, which is far away from the optical microstructures, of the optical film, so as to further improve concealing ability of the backlight module, thereby increasing the assembly yield rate of the backlight module. In other words, the process latitude of each of the components in the backlight module may also be increased.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
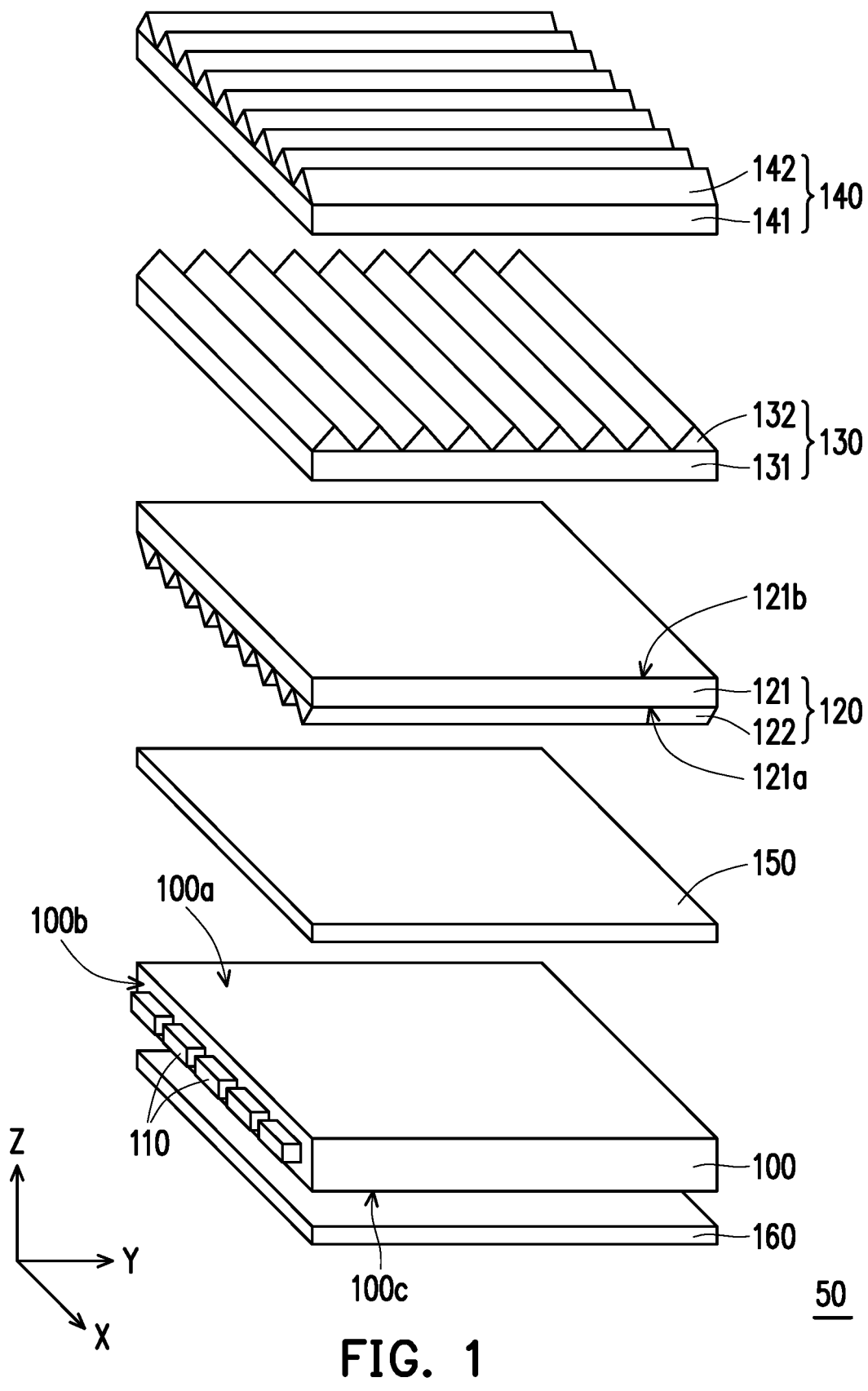
FIG. 1 is a schematic view of a backlight module according to one embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

In the following detailed description of the preferred embodiment, reference is made to the accompanying drawings which form a part hereof, and in which are shown by way of illustration preferred embodiment in which the invention may be practiced, so as to present clearly the above-mentioned, and other the technical content, features, and functions related to the invention. In this regard, the directional terminologies, such as "top", "bottom", "left", "right", "front", or "back", etc., are used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2:
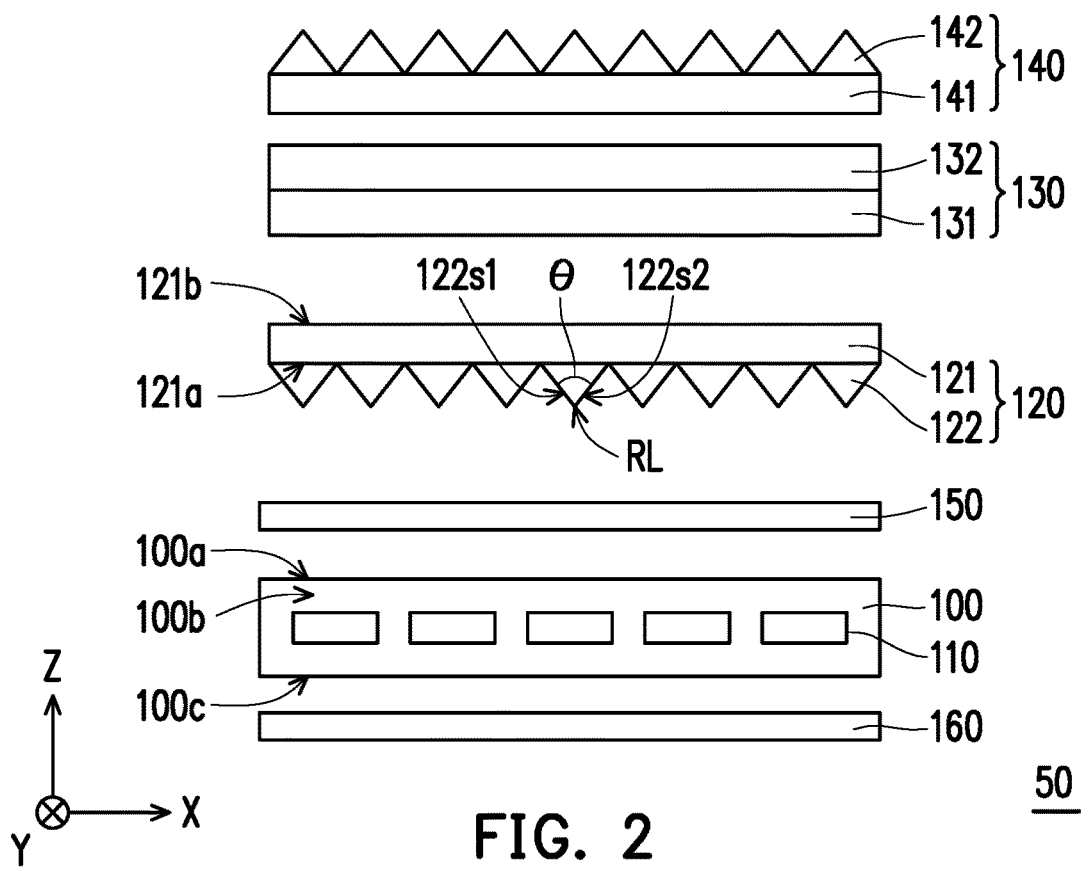
FIG. 2 is a schematic side view of the backlight module in FIG. 1.
Figure 3:
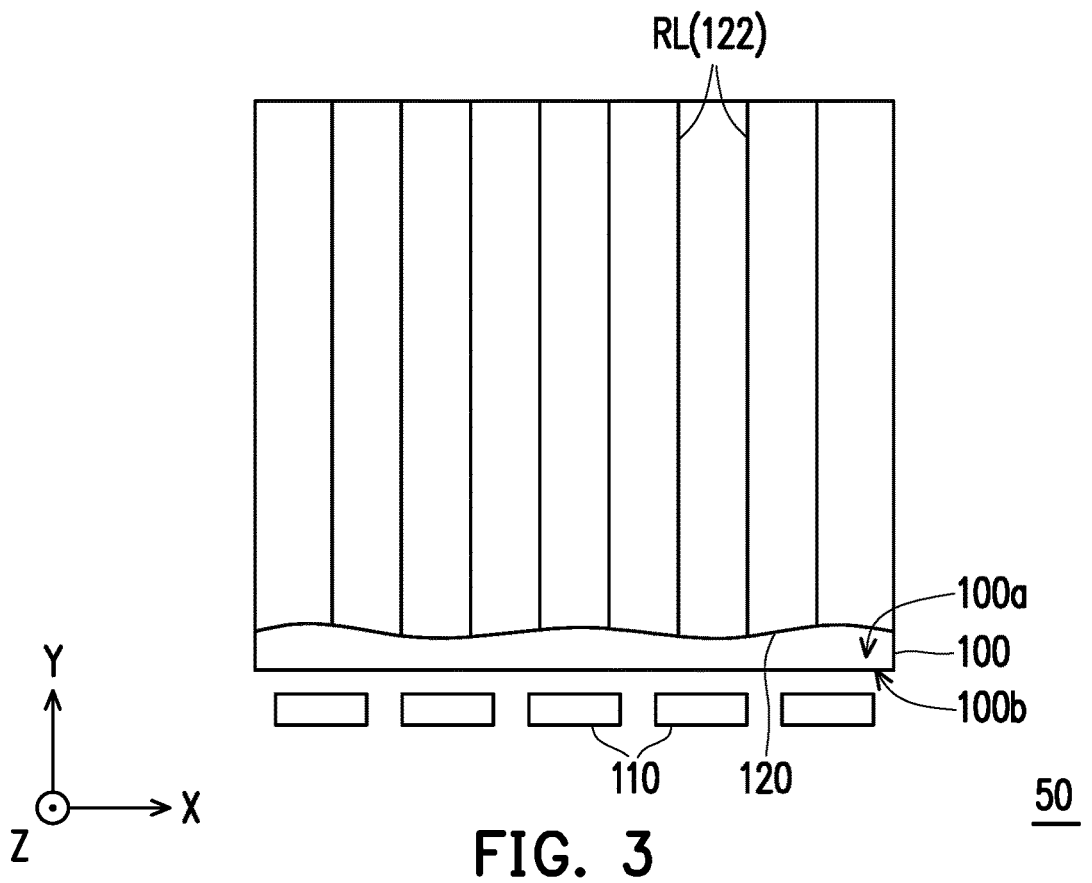
FIG. 3 is a schematic top view of the backlight module in FIG. 1.
Figure 4:
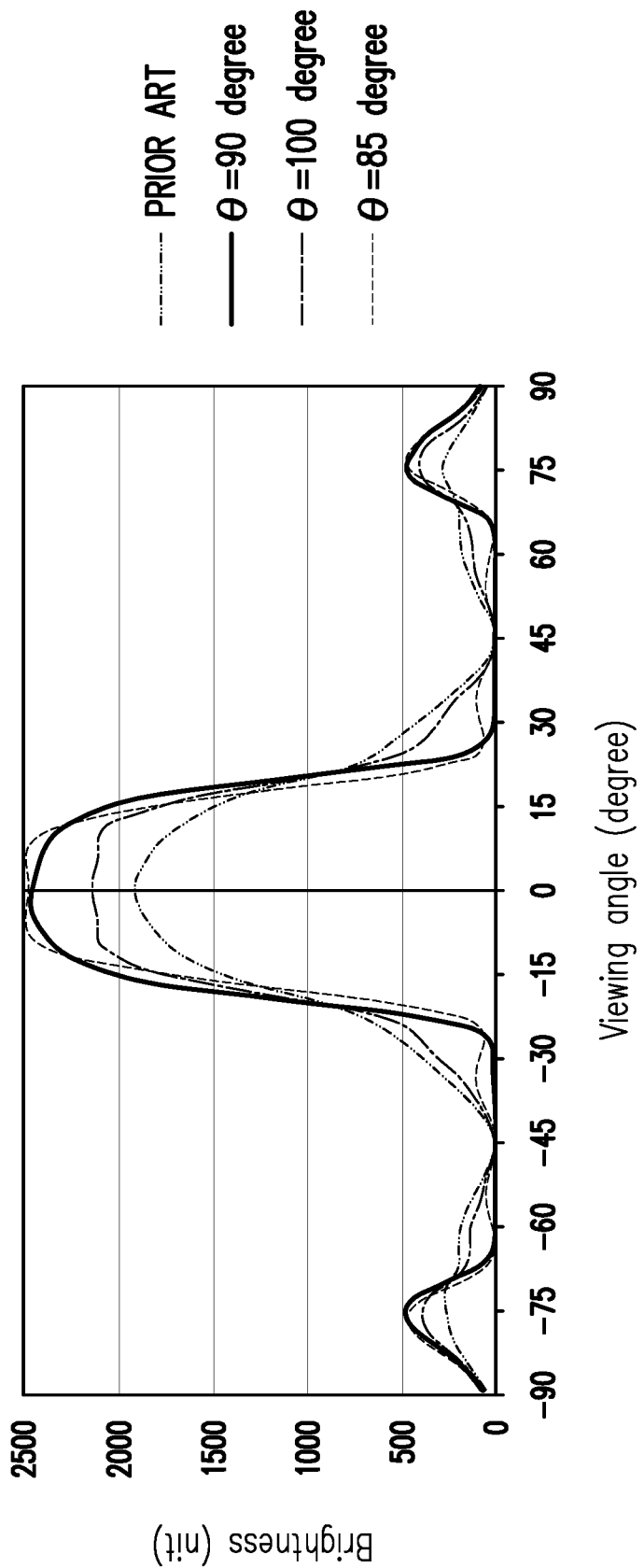
FIG. 4 is a diagram of a curve showing the relation between viewing angle and brightness of the backlight module in FIG. 1.

FIG. 1 is a schematic view of a backlight module according to one embodiment of the disclosure. FIG. 2 is a schematic side view of the backlight module in FIG. 1. FIG. 3 is a schematic top view of the backlight module in FIG. 1. FIG. 4 is a diagram of a curve showing the relation between viewing angle and brightness of the backlight module in FIG. 1. It should be noted here, for clarity, FIG. 3 only shows a light guide plate 100, a light source 110, and optical microstructures 122 of an optical film 120 in FIG. 1.

Referring to FIG. 1 and FIG. 2, a backlight module 50 includes the light guide plate 100, the light source 110, and the optical film 120. The light guide plate 100 has a light emitting surface 100a and a light incident surface 100b, and the light emitting surface 100a and the light incident surface 100b are connected to each other. The optical film 120 is overlapped with the light emitting surface 100a of the light guide plate 100. The light source 110 is disposed on a side of the light incident surface 100b of the light guide plate 100. Namely, the backlight module 50 of the embodiment is an edge-type backlight module. However, the disclosure is not limited thereto. In other embodiments, the backlight module may also be direct backlit module. It should be noted here, in the embodiment, the number of the light sources 110 is five as an example for illustration purpose, and it does not present that the disclosure is limited by the content of the drawings. In other embodiments, the number and disposition of the light sources 110 can be adjusted according to the optical design of the backlight module.

Furthermore, the optical film 120 includes a substrate 121 and a plurality of optical microstructures 122. The substrate 121 has a light incident side 121a and a light emitting side 121b opposite to each other, and the optical microstructures 122 are disposed on the light incident side 121a, which faces the light guide plate 100, of the substrate 121. In the embodiment, the material of the substrate 121 may include polyethylene terephthalate (PET) and polycarbonate (PC). The material of the optical microstructures 122 may include UV glue (ultraviolet curable resin, for example), or other appropriate high molecular polymer.

In the embodiment, the optical microstructures 122 of the optical film 120 may be arranged on the substrate 121 in X direction and may be extended in Y direction. The cross-sectional profile of the optical microstructure 122 on a plane (such as XZ plane) perpendicular to the extending direction (such as Y direction) may have a triangular shape. Namely, the optical microstructures 122 in the embodiment may be triangular prisms. To be more specific, each of the optical microstructures 122 has the first inclined surface 122s1 and the second inclined surface 122s2, and the junction of the first inclined surface 122s1 and the second inclined surface 122s2 defines a ridge line RL of the optical microstructure 122. The disclosure is not limited thereto. In other embodiments, the cross-sectional profile of the optical microstructures 122 on the XZ plane can also be adjusted according to actual requirements of light distribution type (or light splitting effect).

Referring to FIG. 3, in the embodiment, the extending direction (such as Y direction) of the orthogonal projection of the ridge line RL (namely, the extending path) of each of the optical microstructure 122 on the light emitting surface 100a of the light guide plate 100 can be optionally perpendicular to the light incident surface 100b of the light guide plate 100. However, the disclosure is not limited thereto. In other embodiments, the extending direction of the orthogonal projection of the ridge line RL of the optical microstructure 122 on the light guide plate 100 may not be perpendicular to the light incident surface 100b of the light guide plate 100. For example, an angle between the extending direction of the orthogonal projection of the ridge line RL of the optical microstructures 122 on the light guide plate 100 and the light incident surface 100b of the light guide plate 100 is between 45 degrees and 90 degrees. In a preferred embodiment, the angle between the extending direction of the orthogonal projection of the ridge line RL of the optical microstructures 122 on the light guide plate 100 and the light incident surface 100b of the light guide plate 100 is between 75 degrees and 90 degrees.

It is worth mentioning that, the angle between the extending direction of the optical microstructures 122 and the light incident surface 100b of the light guide plate 100 is designed to be in the range of 45 degrees to 90 degrees in order to increase the total amount of light emitted by the backlight module at a viewing angle close to the normal viewing angle and reduce the total amount of light emitted by the backlight module at a viewing angle close to the side viewing angle (such as 45 degrees). On the other hand, the orthogonal projection of the ridge line RL of the optical microstructure 122 on the light emitting surface 100a of the light guide plate 100 is a straight line, but the disclosure is not limited thereto.

Referring to FIG. 1 and FIG. 2, the backlight module 50 further includes a first prism sheet 130 and a second prism sheet 140. The first prism sheet 130 and the second prism sheet 140 are overlapped with the optical film 120 in the normal direction (such as the Z direction) of the light emitting surface 100a of the light guide plate 100, and the first prism sheet 130 and the second prism sheet 140 are located on a side, which is far away from the light guide plate 100, of the optical film 120. The first prism sheet 130 is located between the optical film 120 and the second prism sheet 140. To be more specific, the first prism sheet 130 has a substrate 131 and a plurality of prism structures 132. The prism structures 132 are arranged in the Y direction on a side surface, which is far away from the optical film 120, of the substrate 131, and are extended in X direction. Similarly, the second prism sheet 140 has a substrate 141 and a plurality of prism structures 142. The prism structures 142 are arranged in the X direction on a side surface, which is far away from the first prism sheet 130, of the substrate 141, and are extended in Y direction.

That is to say, in the embodiment, the extending direction (such as the X direction) of the prism structures 132 of the first prism sheet 130 may be perpendicular to the extending direction (such as the Y direction) of the prism structures 142 of the second prism sheet 140, but the disclosure is not limited thereto. In other embodiments, the extending direction of the prism structures 132 of the first prism sheet 130 may not be perpendicular to and may not be parallel to the extending direction of the prism structures 142 of the second prism sheet 140. Namely, the angle between the extending direction of the prism structures 132 of the first prism sheet 130 and the extending direction of the prism structures 142 of the second prism sheet 140 may be greater than 0 degree and less than 90 degrees. From another point of view, in the embodiment, the extending direction of the prism structures 142 of the second prism sheet 140 may be parallel to the extending direction of the optical microstructures 122 of the optical film 120, but the disclosure is not limited thereto. In other embodiments, the angle between the extending direction of the prism structures 142 (projected onto the light emitting surface 100a, for example) of the second prism sheet 140 and the extending direction of the optical microstructures 122 (projected onto the light emitting surface 100a, for example) of the optical film 120 is between 0 degree and 30 degrees.

It is worth mentioning that, the first prism sheet 130 and the second prism sheet 140 are disposed on a side, which is far away from the optical microstructures 122, of the optical film 120, so that a part of the light beams from the optical film 120 is totally reflected in the two prism sheets in order to improve concealing ability of the backlight module 50, thereby increasing the assembly yield rate of the backlight module 50. In other words, the process latitude of each of the components in the backlight module 50 may also be increased.

Referring to FIG. 2 and FIG. 4, to be more specific, the first inclined surface 122s1 and the second inclined surface 122s2 of the optical microstructure 122 has an apex angle θ therebetween, and an angular degree of the apex angle θ of the optical microstructure 122 is between 85 degrees and 110 degrees, but the disclosure is not limited thereto. When the angular degree of the apex angle θ of the optical microstructure 122 is designed to be between 85 degrees and 110 degrees (such as 85 degrees, 90 degrees, and 100 degrees), the brightness of light emitted by the backlight module 50 at a viewing angle (such as an viewing angle from −15 degrees to 15 degrees) close to the normal viewing angle is all higher than the brightness of light emitted by the backlight module without optical film 120, and the brightness of light emitted by the backlight module 50 at a viewing angle close to the viewing angle of 45 degrees is all lower than the brightness of light emitted by the backlight module without optical film 120. Therefore, as shown in FIG. 4, with the structure of the backlight module 50 in FIG. 1, the optimum design value of the angular degree of the apex angle θ of the optical microstructure 122 is 90 degrees.

Based on above description, the angular degree of the apex angle θ of the optical microstructure 122 is designed to be in the range of 85 degrees to 110 degrees in order to further increase the total amount of light emitted by the backlight module at a viewing angle close to the normal viewing angle and efficiently reduce the total amount of light emitted by the backlight module at a viewing angle close to the viewing angle of 45 degrees. It should be noted here, the viewing angle (such as a viewing angle of 45 degrees or 60 degrees) that is used to determine the optimum design value of the angular degree of the apex angle θ is selected according to optical specification of anti-peep display apparatus. In other embodiments, the viewing angle that is used to determine the optimum design value of the angular degree of the apex angle θ may also be adjusted according to applications of backlight module.

Referring to FIG. 1 and FIG. 2, as an option, the backlight module 50 may further include a diffusion sheet 150. The diffusion sheet 150 is overlapped with the light emitting surface 100a of the light guide plate 100 and is located between the light guide plate 100 and the optical film 120. However, the disclosure is not limited thereto. In other embodiments, the backlight module may not have the diffusion sheet 150. On the other hand, as an option, the backlight module 50 may further include a reflection sheet 160. The light guide plate 100 further have a bottom surface 100c opposite to the light emitting surface 100a, and the reflection sheet 160 is disposed on a side, which is close to the bottom surface 100c, of the light guide plate 100. A part of the light beams emitted by the light sources 110 exits from the bottom surface 100c of the light guide plate 100 during the transmission in the light guide plate 100, thereby causing loss of light energy. Therefore, through the arrangement of the reflection sheet 160, the part of the light beams can be reflected and transmitted back to the light guide plate 100 so as to improve the light energy utilization rate of the light source 110. However, the disclosure is not limited thereto. In other embodiments, the backlight module may not have the reflection sheet 160.

In the following, other embodiments will be described in detail to explain the disclosure in detail, and the same components will be denoted by the same reference numerals, and the description of the same technical content will be omitted. For the omitted part, please refer to the foregoing embodiments, and details are not described below.

Figure 5:
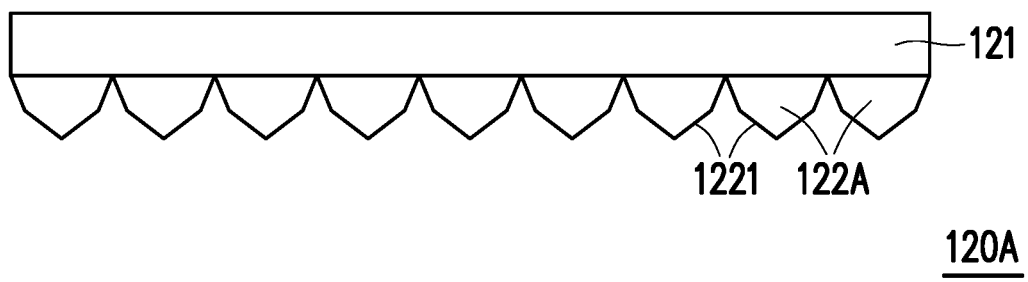
FIG. 5 is a cross-sectional schematic view of an optical film according to another embodiment of the disclosure.
Figure 6:
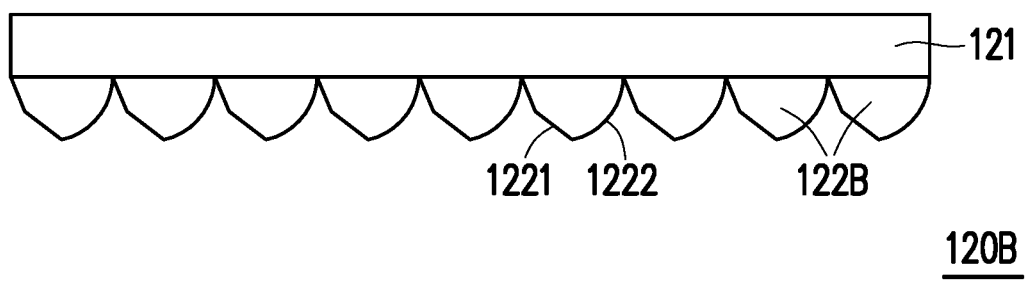
FIG. 6 is a cross-sectional schematic view of an optical film according to yet another embodiment of the disclosure.

FIG. 5 is a cross-sectional schematic view of an optical film according to another embodiment of the disclosure. FIG. 6 is a cross-sectional schematic view of an optical film according to yet another embodiment of the disclosure. Referring to FIG. 5 and FIG. 6, an optical film 120A (as shown in FIG. 5) and an optical film 120B (as shown in FIG. 6) are different from the optical film 120 (as shown in FIG. 2) about the configuration of the optical microstructures. To be more specific, similarly, each of the optical microstructures of the optical films 120, 120A, and 120B has an apex angle, and the cross-sectional profile of the optical microstructure 122A of the optical film 120A on the XZ plane is constituted by a plurality of straight-line segments 1221 (such as polyline shape). The cross-sectional profile of the optical microstructure 122B of the optical film 120B on the XZ plane is constituted by the straight-line segment 1221 and the curved-line segment 1222. However, the disclosure is not limited thereto. In other embodiments, the cross-sectional profile of the optical microstructure of the optical film on the XZ plane can also be adjusted according to different optical design requirements.

Figure 7:
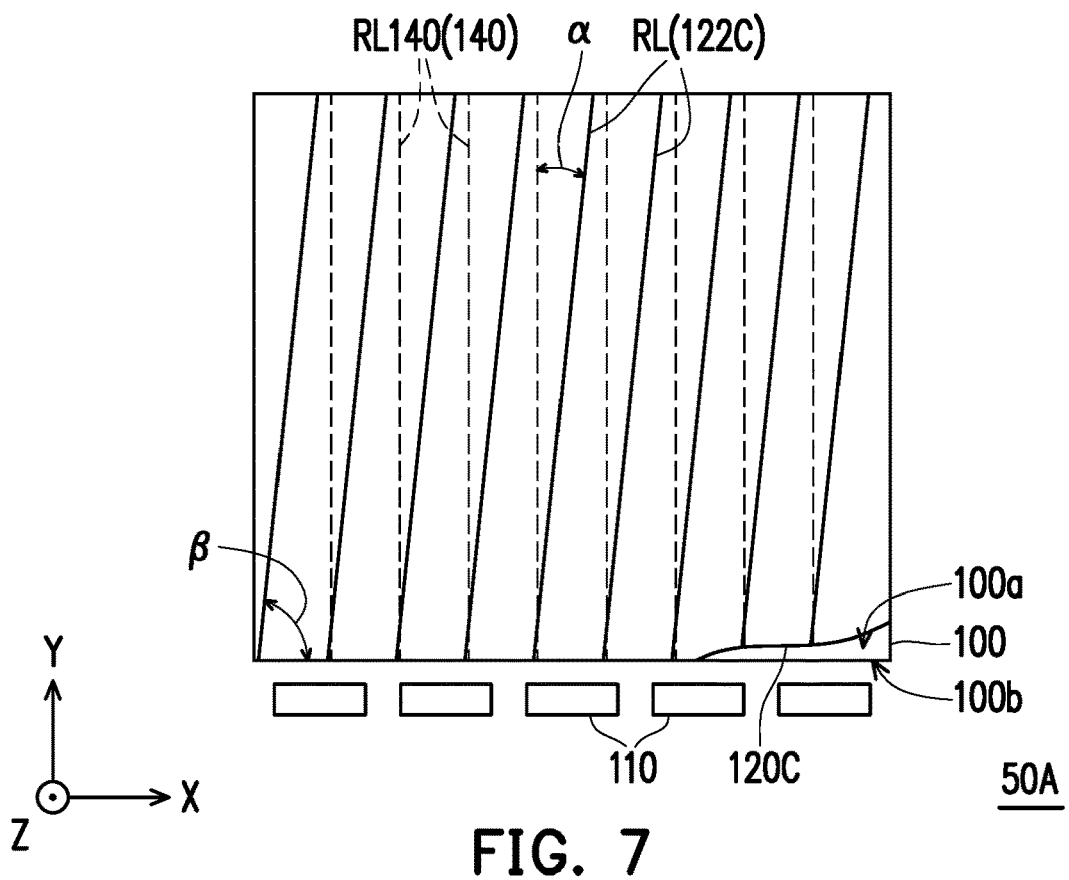
FIG. 7 is a schematic top view of a backlight module according to another embodiment of the disclosure.
Figure 8:
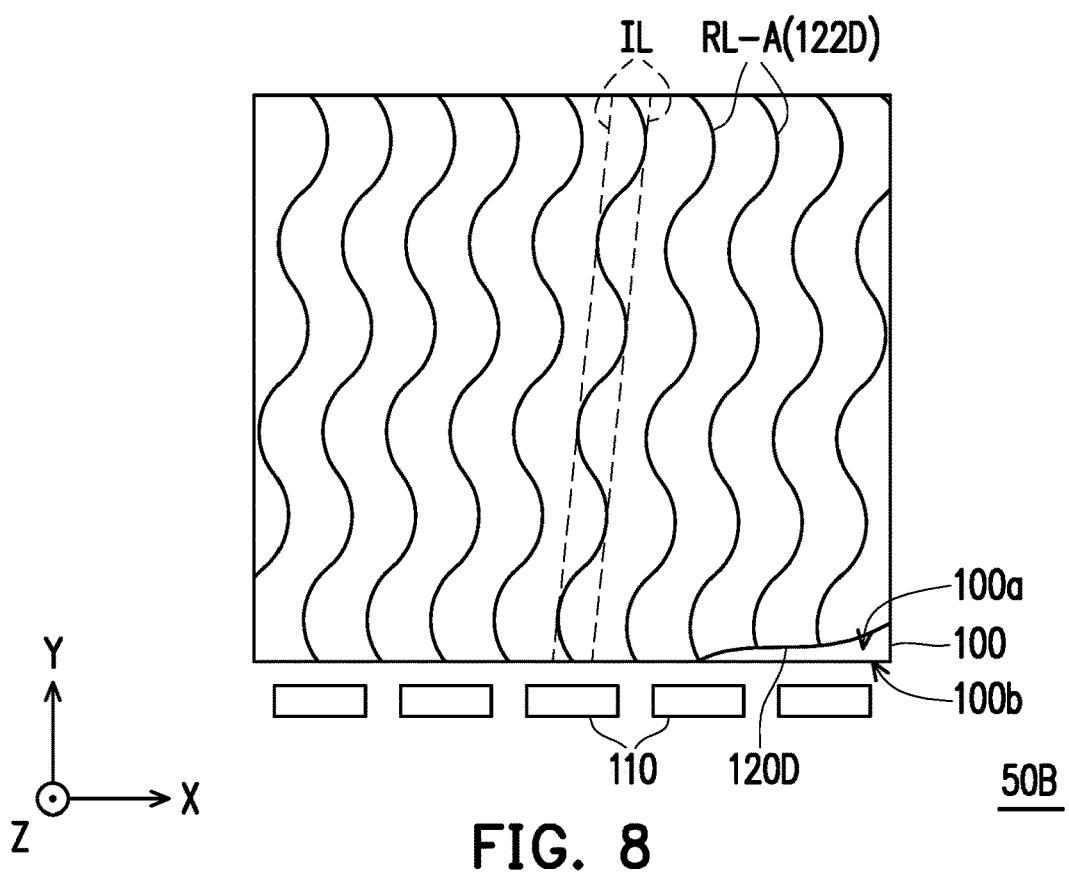
FIG. 8 is a schematic top view of a backlight module according to yet another embodiment of the disclosure.

FIG. 7 is a schematic top view of a backlight module according to another embodiment of the disclosure. FIG. 8 is a schematic top view of a backlight module according to yet another embodiment of the disclosure. It should be noted here, for clarity, FIG. 7 and FIG. 8 only show the light guide plate 100, the light sources 110, the optical microstructures 122C of the optical film 120C, and the optical microstructures 122D of the optical film 120D. Referring to FIG. 7, the difference between the backlight module 50A of the embodiment and the backlight module 50 in FIG. 3 is the extending direction of the optical microstructures. In the embodiment, the orthogonal projection of the ridge line RL (namely, the extending path) of the optical microstructure 122C of the optical film 120C on the light emitting surface 100a of the light guide plate 100 is not parallel to the orthogonal projection of the extending path (namely the axial direction of the ridge line RL140) of the second prism sheet 140 on the light emitting surface 100a of the light guide plate 100. To be more specific, the ridge line RL of the optical microstructure 122C and the ridge line RL140 of the second prism sheet 140 have an angle α, which is greater than 0 degree, therebetween, and the angle α is less than or equal to 30 degrees. Accordingly, the total amount of light emitted by the backlight module 50A at a viewing angle close to the normal viewing angle is increased.

On the other hand, in the embodiment, the extending direction of the orthogonal projection of the ridge line RL of the optical microstructure 122C on the light guide plate 100 and the light incident surface 100b of the light guide plate 100 have an angle β, which is less than 90 degrees, therebetween, and the angle β is greater than or equal to 75 degrees. Accordingly, the bright and dark fringe pattern, such as the moiré pattern, generated between the optical film 120C and the second prism sheet 140 (or the first prism sheet 130 as shown in FIG. 1) can be effectively suppressed. In other words, the uniformity of the light emitted from the backlight module 50A can be improved.

Referring to FIG. 8, the difference between the backlight module 50B of the embodiment and the backlight modules 50 and 50A in FIGS. 3 and 7 is the configuration of the optical microstructures. In the embodiment, an orthogonal projection of a ridge line RL-A (such as an extending path) of the optical microstructure 122D of the optical film 120D on the light emitting surface 100a of the light guide plate 100 has a wave shape. To be more specific, although the extending path of the optical microstructure 122D has a wave shape, the orthogonal projection of each of the ridge line RL-A on the light guide plate 100 is still confined between two virtual straight lines IL, and the extending direction of the two virtual straight lines IL is substantially the same as the extending direction of the optical microstructures 122 in FIG. 3 or the extending direction of the optical microstructures 122C in FIG. 7. In other words, the extending direction of the optical microstructure 122D is substantially the same as the extending direction of the optical microstructure 122 in FIG. 3 or the extending direction of the optical microstructure 122C in FIG. 7.

It is worth mentioning that, since the orthogonal projection of the optical microstructure 122D on the light emitting surface 100a of the light guide plate 100 has a curved shape that is curved back and forth (wave shape), the bright and dark fringe pattern, such as the moiré pattern, generated between the optical film 120D and the two prism sheets (the first prism sheet 130 and the second prism sheet 140 as shown in FIG. 1) can be effectively suppressed. In other words, the uniformity of the light emitted from the backlight module 50B can be improved. It should be noted here, the configuration (such as wave shape) of the optical microstructure 122D can also be optionally applied to the design of the second prism sheet 140 (or the first prism sheet 130), so as to achieve the effect of suppressing the bright and dark fringe pattern generated between the optical film and the two prism sheets. Otherwise, when the backlight module 50B and the display panel 200 (as shown in FIG. 9) are overlapped with each other, the optical microstructure 122D having wave shape configuration (or the extending direction of the prism structure of at least one of the two prism sheets has wave shape configuration) can also suppress the bright and dark fringe pattern generated between the optical film 120D (or the prism sheet) and the display panel 200.

Figure 9:
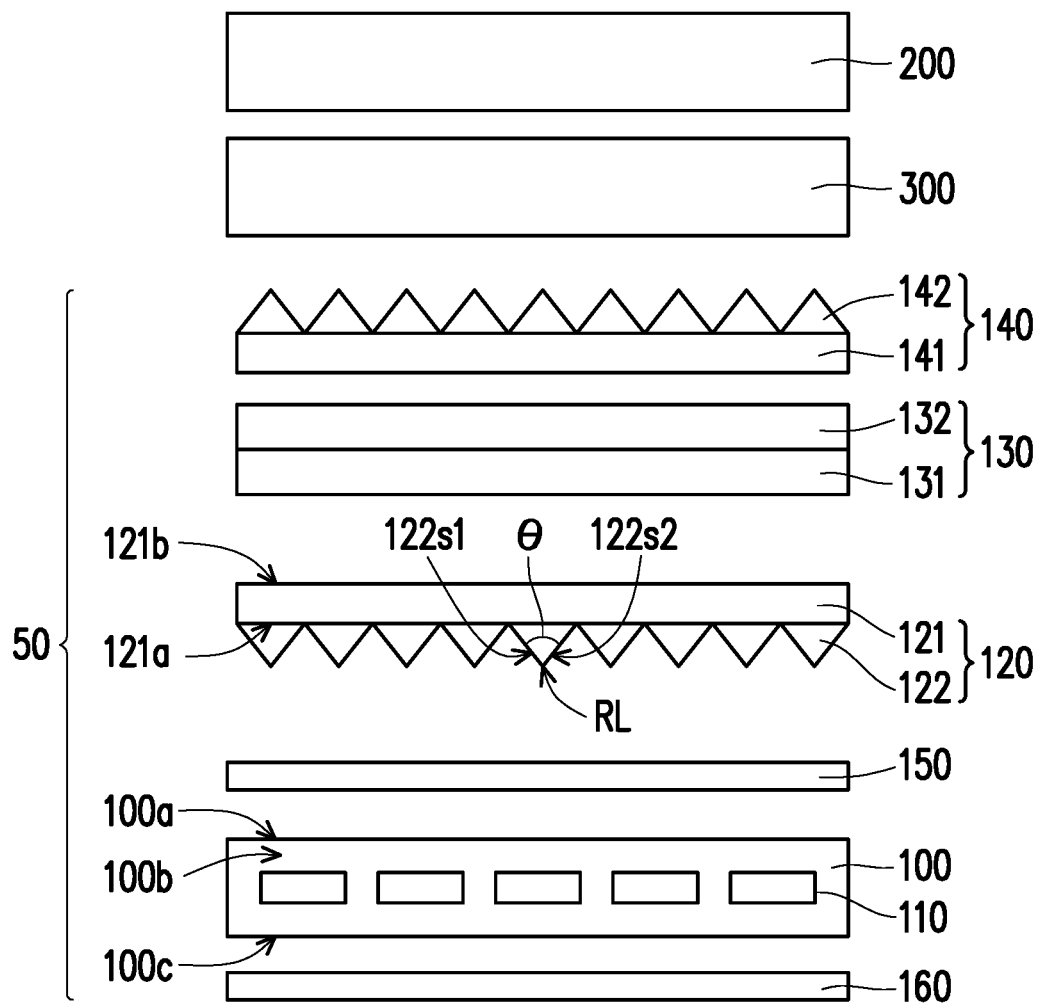
FIG. 9 is a schematic side view of a display apparatus according to one embodiment of the disclosure.
Figure 10:
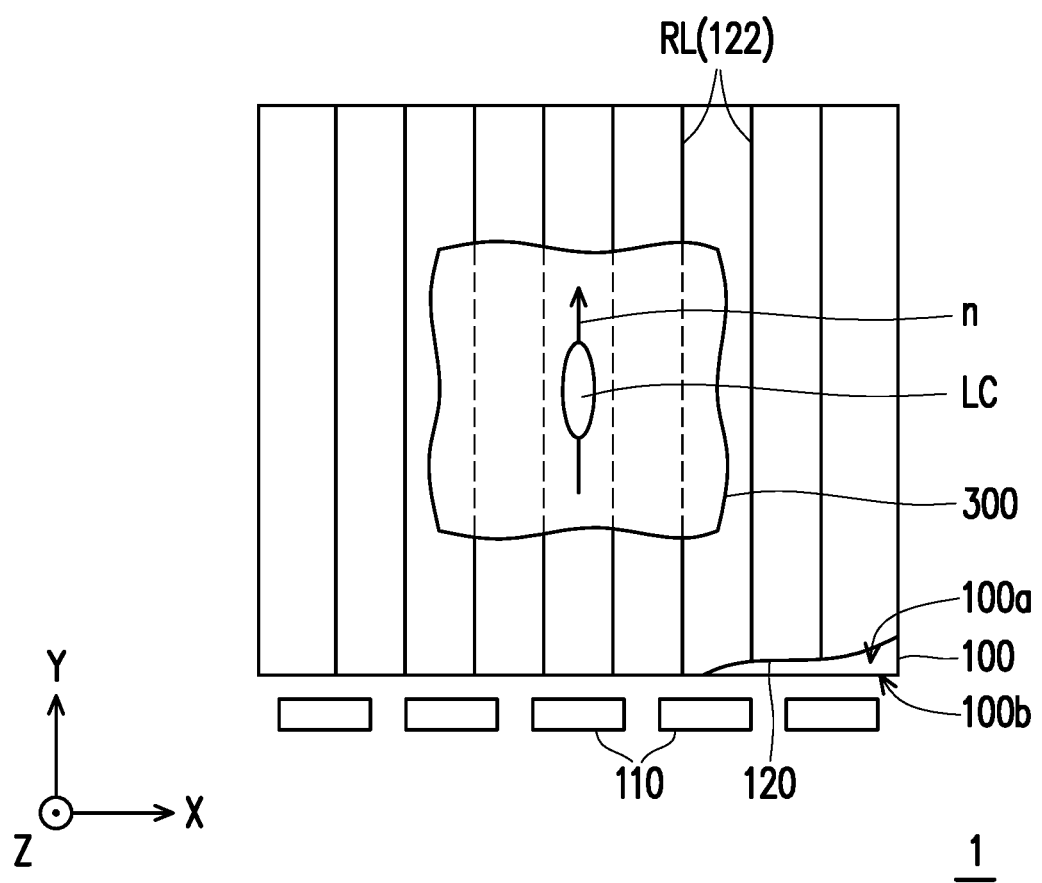
FIG. 10 is a schematic top view of the display apparatus in FIG. 9.

FIG. 9 is a schematic side view of a display apparatus according to one embodiment of the disclosure. FIG. 10 is a schematic top view of the display apparatus in FIG. 9. Referring to FIG. 2 and FIG. 9, a display apparatus 1 may include the backlight module 50, the display panel 200, and an electrically controlled viewing angle switching device 300, and the display panel 200 and the electrically controlled viewing angle switching device 300 are overlapped with the light emitting surface 100a of the light guide plate 100. To be more specific, the display apparatus 1 of the embodiment has a switchable anti-peep function. However, the disclosure is not limited thereto. In other embodiments, the display apparatus may not have the electrically controlled viewing angle switching device 300. In the embodiment, the display panel 200 may be a liquid crystal display (LCD) panel, an electrophoretic display (EPD) panel, and other non-self-luminous display panels. In the embodiment, the electrically controlled viewing angle switching device 300 can be optionally disposed between the display panel 200 and the second prism sheet 140, but the disclosure is not limited thereto. In another embodiment, the display panel 200 may be disposed between the electrically controlled viewing angle switching device 300 and the second prism sheet 140.

For example, the electrically controlled viewing angle switching device 300 may include a liquid crystal cell (not shown) and two polarizers (not shown) disposed on two opposite sides of the liquid crystal cell. The liquid crystal cell includes a liquid crystal layer (not shown) and two electrode layers (not shown) located on two opposite sides of the liquid crystal layer, and the two electrode layers can form an electric field between these two electrode layers and the electric field is used to drive a plurality of liquid crystal molecules (not shown) of the liquid crystal layer to rotate. Accordingly, the optical axes of the plurality of liquid crystal molecules may vary according to different electric field intensities and distributions, so that the amount of light emitted by the electrically controlled viewing angle switching device 300 at different viewing angles can be adjusted.

Referring to FIG. 10, in the embodiment, the liquid crystal molecule LC of the electrically controlled viewing angle switching device 300 has an optical axis n, and the axial direction of the optical axis n may be parallel to the extending path (such as the extending direction of the ridge line RL) of the optical microstructures 122 of the optical film 120. On the other hand, the axial directions of the absorption axes (not shown) of the two polarizers of the electrically controlled viewing angle switching device 300 may be parallel or perpendicular to the axial direction of the optical axis n of the liquid crystal molecule LC, respectively. It should be noted here, the electrically controlled viewing angle switching device 300 has a viewing angle control direction (such as X direction) that is perpendicular to the axial direction of the optical axis n of the liquid crystal molecule LC. In the viewing angle control direction, the display apparatus 1 can electrically change the total amount of emitted light in the large viewing angle range. For example, the total amount of emitted light in the large viewing angle range can be greatly reduced (or suppressed) in the anti-peep mode, and the total amount of emitted light in the large viewing angle range can be restored in the sharing mode. It is worth mentioning that, the backlight module 50 of the embodiment has a better light collecting efficiency, so as to increase the total amount of light emitted by the display apparatus 1 at a viewing angle close to the normal viewing angle. In other words, the backlight module 50 can further provide a better anti-peep effect for the display apparatus 1.

Figure 11:
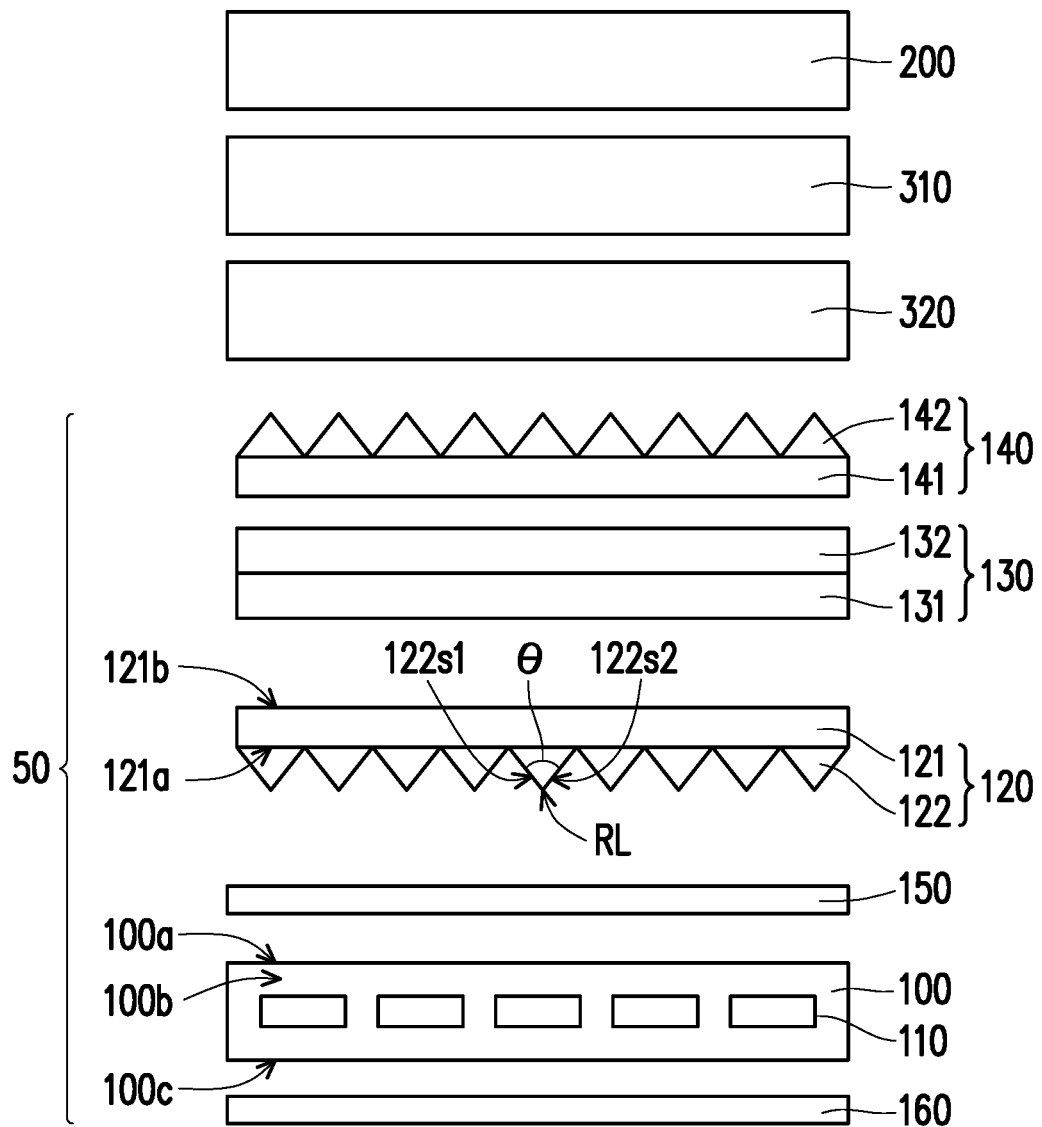
FIG. 11 is a schematic side view of a display apparatus according to another embodiment of the disclosure.

FIG. 11 is a schematic side view of a display apparatus according to another embodiment of the disclosure. Referring to FIG. 2 and FIG. 11, in the embodiment, a display apparatus 2 may include the backlight module 50, the display panel 200, an electrically controlled diffusion film 310, and a viewing angle limiting optical film 320. The electrically controlled diffusion film 310 and the viewing angle limiting optical film 320 are overlapped with the display panel 200. The electrically controlled diffusion film 310 is located between the display panel 200 and the viewing angle limiting optical film 320, and the viewing angle limiting optical film 320 is located between the second prism sheet 140 and the electrically controlled diffusion film 310. To be more specific, the display apparatus 2 of the embodiment also has a switchable anti-peep function.

For example, the viewing angle limiting optical film 320 is, for example, anti-peep film or phase retardation film. The anti-peep film is, for example, a 3M grating structure-like anti-peep film. The phase retardation film includes an A-plate, a B-plate, a C-plate or an O-plate. On the other hand, the electrically controlled diffusion film 310 is, for example, a polymer dispersed liquid crystal (PDLC) film, a polymer network liquid crystal (PNLC) film, or a liquid crystal lens (LC Lens).

Furthermore, the display apparatus 2 can adjust the light beam distribution pattern emitted from the backlight module 50 through the electrically controlled diffusion film 310. For example, in the sharing mode, the light beam transmitted at small viewing angle is guided to become the light beam transmitted at large viewing angle by scattering method. In the anti-peep mode, the electrically controlled diffusion film 310 is disabled, and the viewing angle limiting optical film 320 restricts the amount of emitted light at large viewing angle, thereby achieving the purpose of anti-peeping. It is worth mentioning that, the backlight module 50 of the embodiment has a better light collecting efficiency, so as to increase the total amount of light emitted by the display apparatus 2 at a viewing angle close to the normal viewing angle. In other words, the backlight module 50 can further provide a better anti-peeping effect for the display apparatus 2.

Summarily, in the backlight module and the display apparatus of the embodiment of the disclosure, the optical film has a plurality of optical microstructures facing the light guide plate, and the angle between the extending direction of the optical microstructures and the light incident surface of the light guide plate is between 75 degrees and 90 degrees, so as to increase the total amount of light emitted by the backlight module at a viewing angle close to the normal viewing angle (namely, increasing the light collecting efficiency of the backlight module). On the other hand, the two prism sheets are disposed on a side, which is far away from the optical microstructures, of the optical film, in order to improve concealing ability of the backlight module, thereby increasing the assembly yield rate of the backlight module. In other words, the process latitude of each of the components in the backlight module may also be increased.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A backlight module, comprising:
   a light guide plate, having a light incident surface and a light emitting surface connected to each other;
   a light source, disposed on a side of the light incident surface of the light guide plate;
   an optical film, overlapped with the light emitting surface of the light guide plate, and having a plurality of optical microstructures facing the light emitting surface, wherein an angle between an extending direction of the optical microstructures and the light incident surface of the light guide plate is 90 degrees or between 45 degrees and 90 degrees;
   a diffusion sheet, disposed between the light guide plate and the optical film; and
   a first prism sheet and a second prism sheet, overlapped with the optical film, the first prism sheet and the second prism sheet being positioned on a side far away from the light guide plate of the optical film, wherein an extending direction of a plurality of prism structures of the first prism sheet is not parallel to an extending direction of a plurality of prism structures of the second prism sheet.

2. The backlight module as recited in claim 1, wherein the first prism sheet is located between the optical film and the second prism sheet, and an angle between the extending direction of the prism structures of the second prism sheet and the extending direction of the optical microstructures of the optical film is between 0 degree and 30 degrees.

3. The backlight module as recited in claim 1, wherein a cross-sectional profile of each of the optical microstructures of the optical film has a triangular shape, a shape constituted of a plurality of straight-line segments, or a shape constituted of a straight-line segment and a curved-line segment, wherein each of the optical microstructures has an apex angle, and an angular degree of the apex angle is between 85 degrees and 110 degrees.

4. The backlight module as recited in claim 1, wherein an orthogonal projection of an extending path of a ridge line of each of the optical microstructures of the optical film or an orthogonal projection of an extending path of each of the prism structures of the second prism sheet onto the light emitting surface of the light guide plate has a wave shape.

5. A display apparatus, comprising:
   a display panel; and
   a backlight module, overlapped with the display panel and comprising:
      a light guide plate, having a light incident surface and a light emitting surface connected to each other, wherein the display panel is overlapped with the light emitting surface;
      a light source, disposed on a side of the light incident surface of the light guide plate;
      an optical film, overlapped with the light emitting surface and located between the light guide plate and the display panel, the optical film having a plurality of optical microstructures facing the light emitting surface, wherein an angle between an extending direction of the optical microstructures and the light incident surface of the light guide plate is 90 degrees or between 45 degrees and 90 degrees;
      a diffusion sheet, disposed between the light guide plate and the optical film; and
      a first prism sheet and a second prism sheet, overlapped with the optical film and located between the display panel and the optical film, wherein an extending direction of a plurality of prism structures of the first prism sheet is not parallel to an extending direction of a plurality of prism structures of the second prism sheet.

6. The display apparatus as recited in claim 5, further comprising an electrically controlled viewing angle switching device overlapped with the display panel.

7. The display apparatus as recited in claim 6, wherein the first prism sheet is located between the optical film and the second prism sheet, and the electrically controlled viewing angle switching device is located between the display panel and the second prism sheet.

8. The display apparatus as recited in claim 5, further comprises:
   a viewing angle limiting optical film and an electrically controlled diffusion film, overlapped with the display panel, and the electrically controlled diffusion film is located between the display panel and the viewing angle limiting optical film.

9. The display apparatus as recited in claim 8, wherein the first prism sheet is located between the optical film and the second prism sheet, and the viewing angle limiting optical film is located between the second prism sheet and the electrically controlled diffusion film.

* * * * *